(12) United States Patent
Lim

(10) Patent No.: US 11,434,371 B2
(45) Date of Patent: Sep. 6, 2022

(54) ROOM TEMPERATURE STORAGE-STABLE UV/VIS AND MOISTURE DUAL CURABLE POLYSILOXANE COMPOSITION

(71) Applicant: Dow Silicones Corporation, Midland, MI (US)

(72) Inventor: Jong-Ok Lim, Seoul (KR)

(73) Assignee: Dow Silicones Corporation, Midland, MI (US)

( * ) Notice: Subject to any disclaimer, the term of this patent is extended or adjusted under 35 U.S.C. 154(b) by 75 days.

(21) Appl. No.: 17/089,850

(22) Filed: Nov. 5, 2020

(65) Prior Publication Data
US 2021/0139703 A1 May 13, 2021

Related U.S. Application Data

(60) Provisional application No. 62/934,565, filed on Nov. 13, 2019.

(51) Int. Cl.
*C08L 83/04* (2006.01)
*C08L 83/02* (2006.01)

(52) U.S. Cl.
CPC ......... *C08L 83/04* (2013.01); *C08L 2205/025* (2013.01)

(58) Field of Classification Search
CPC . C09D 183/06; C08L 2205/025; C08L 83/04; C08L 77/04; C08L 5/56; C08L 5/5415; C08L 5/101; C08J 2483/08; C08J 2383/07; C08G 77/20; C08G 77/28; C08G 77/18; C08G 77/07
See application file for complete search history.

(56) References Cited

U.S. PATENT DOCUMENTS

| 5,684,113 | A | * | 11/1997 | Nakanishi | ............... | C08L 83/00 528/30 |
| 5,753,720 | A | * | 5/1998 | Nakanishi | ............... | C09J 183/04 428/452 |
| 7,893,170 | B2 | * | 2/2011 | Wakioka | ............... | C08K 5/0091 525/477 |
| 2008/0076878 | A1 | * | 3/2008 | Wakioka | ............... | C08K 5/544 525/190 |
| 2010/0069523 | A1 | * | 3/2010 | Alvarez | ............... | C09D 183/14 528/33 |
| 2018/0334587 | A1 | | 11/2018 | Betzig et al. | | |

FOREIGN PATENT DOCUMENTS

WO 2019028013 2/2019

OTHER PUBLICATIONS

Taylor, et al, "Nuclear Magnetic Resonance Spectroscopy", The Analytical Chemistry of Silicones, Smith, A. Lee, ed., John Wiley & Sons: NY, 1991, p. 347ff.

* cited by examiner

*Primary Examiner* — Sanza L. McClendon
(74) *Attorney, Agent, or Firm* — Steven W. Mork

(57) ABSTRACT

A composition containing the following components: (a) a polysiloxane having at least one alkenyl functional group and at least one alkoxy functional group; (b) a mercapto-functional polysiloxane with at least one mercapto functionality; (c) a silane crosslinker with at least two alkoxy groups per molecule; (d) a photoinitiator; (e) a combination of zirconium tetraalkoxylate and alkylacetoacetate at a mole ratio in a range of 1:1 to 1:4.

10 Claims, No Drawings

ROOM TEMPERATURE STORAGE-STABLE UV/VIS AND MOISTURE DUAL CURABLE POLYSILOXANE COMPOSITION

BACKGROUND OF THE INVENTION

Field of the Invention

The present invention relates to a dual cure polyorganosiloxane composition that is storage stable. The composition contains: (a) a polysiloxane having at least one vinyl functionality and at least one alkoxy functionality; (b) a polysiloxane with at least one mercapto functionality; (c) a silane crosslinker with at least two alkoxy groups per molecule; (d) a photoinitiator; and (e) a combination of zirconium tetraalkoxylate and alkylacetoacetate.

INTRODUCTION

Light and moisture dual cure compositions are useful, for example, in coating, encapsulation, potting and adhesive applications where exposure of all portions of a coating to light is difficult yet rapid curing of the coating is desirable. The light curing character of the composition allows curing by exposure to light such as ultraviolet (UV) light. The moisture cure mechanism serves to cure portions of the composition blocked from exposure to light ("shadow areas"). Dual cure mechanisms are valuable in coatings to enable moisture curing to complete curing when light cannot access all areas of a coating.

The light cure mechanism is typically triggered by irradiation with UV and/or visible light. One light cure mechanism utilizes a "thiol-ene" reactive system comprising thiol-containing reactants and reactants having carbon-carbon unsaturated bonds. Upon exposure to UV and/or visible light the thiol functionality reacts with and adds across a carbon-carbon unsaturated bond. Typically, the thiol-ene reactive system further comprises photoinitiator and a catalyst.

A challenge with thiol-ene and titanite catalyzed moisture cure reactive systems is that they become less effective over time, particularly when stored for months at temperature of 23° C. or higher, or when stored for weeks at temperatures of 50° C. or higher. That means the room temperature storage, and especially higher temperature storage capability of thiol-ene based dual cure reactive systems is relatively short and the reactive system loses its UV cure performance characteristics. This phenomenon is more common when the system includes photoinitiators such as ethyl (2 4 6-trimethylbenzoyl) phenylphosphinate, 2-hydroxy-2-methyl-1-phenyl-propan-1-one, and 1-hydroxy-cyclohexyl-phenyl-ketone. Therefore, such thiol-ene based dual cure systems require storage at refrigerated temperatures (typically 4° C. or lower) to maintain UV cure reactive properties. Hence, it is desirable to identify a thiol-ene based dual cure reactive system that retains UV cure performance even after aging at temperatures of 23° C. or higher.

BRIEF SUMMARY OF THE INVENTION

The present invention provides a thiol-ene based dual cure reactive system that retains UV cure performance even after aging at temperatures of 23° C. or higher.

The present invention is a result of discovering that the moisture cure catalyst used in current systems contributes to the diminished shelf life and the unexpected discovery that a combination of zirconium tetraalkoxylate and alkylacetoacetate both serves as a moisture cure catalyst suitable for thiol-ene based dual cure reactive systems and does not diminish the reactive composition's dual cure behavior after aging the reactive composition for an extended period of time.

In a first aspect, the present invention is a composition comprising the following components: (a) a polysiloxane having at least one alkenyl functional group and at least one alkoxy functional group; (b) a mercapto-functional polysiloxane with at least one mercapto functionality; (c) a silane crosslinker with at least two alkoxy groups per molecule; (d) a photoinitiator; (e) a combination of zirconium tetraalkoxylate and alkylacetoacetate at a mole ratio in a range of 1:1 to 1:4.

Compositions of the present invention are useful as dual cure coatings that can be cured by exposure to light and by exposure to moisture.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

"$C_x$" refers to a carbon chain of x carbon atoms. For instance, a "$C_1$ to $C_{10}$ alkoxy group" refers to an alkoxy group that has from one to 10 carbon atoms.

"Light", in its broadest scope as used herein, refers to electromagnetic radiation. Preferably, light as used herein refers to visible and/or ultraviolet (UV) light.

"Polyorganosiloxane" is a compound that contains multiple siloxane units ("polysiloxane"), at least one of which has an organic group bonded to at least one silicon atom. Polysiloxanes comprise multiple siloxane linkages (Si—O—Si) and are typically characterized by what siloxane units make up the siloxane linkages. Siloxane units can be selected from a group consisting of M-type, D-type, T-type and Q units. By convention M units have the formula $(CH_3)_3SiO_{1/2}$, D units have the formula $(CH_3)_2SiO_{2/2}$, T units have the formula $(CH_3)SiO_{3/2}$ and Q units have the formula $SiO_{4/2}$. M-type, D-type and T-type units refer to conventional units that may have one or more methyl group replaced with hydrogen, or some other moiety and are often identified by the siloxane unit letter designation with a superscript identifying the moiety replacing a methyl group. For example, $D^{Ph}$ refers to a D unit where one of the methyl groups has been replaced with a phenyl group and $D^{PhPh}$ refers to a D unit where each of the two methyl groups have been replace with a phenyl group. Herein, subscripts used in resinous polyorganosiloxane formulas indicate the average mole-percent of the associated siloxane unit relative to all siloxane units in the molecule, while subscripts used in linear polyorganosiloxane formulas indicate the average absolute number of the associated siloxane unit in the molecule. For polysiloxanes, determine the subscript values for how many, or molar ratio of, siloxane units using $^{29}$Si, $^{13}$C and $^{1}$H nuclear magnetic resonance spectroscopy (see, e.g., *The Analytical Chemistry of Silicones*, Smith, A. Lee, ed., John Wiley & Sons: NY, 1991, p. 347ff.).

Alkenyl and Alkoxy Functional Siloxane

The present invention is a composition that comprises a polysiloxane having at least one alkenyl functional group and at least one alkoxy functional group (an alkenyl and alkoxy functional polysiloxane).

The alkenyl and alkoxy functional siloxane can comprise 2 or more, 3 or more, 4 or more, even 5 or more while at the same time generally comprises 10 or fewer, 8 or fewer, 6 or fewer, 4 or fewer and can comprise 2 or fewer alkenyl functional groups on average per molecule. Desirably, the alkenyl functional groups are "terminal" functional groups, which means they are attached to the silicon atom of an M-type siloxane resin. Preferably, the alkenyl functional group is a vinyl group. Determine the average number of terminally unsaturated alkenyl groups per molecule of the alkenyl and alkoxy functional polysiloxane preferably from the identity of the structure of the compound when preparing the composition. If it is unknown what compound was used for the alkenyl and alkoxy functional polysiloxane in preparing the composition, determine the number of terminally unsaturated alkenyl groups per molecule of component (b) by $^{1}$H, $^{13}$C and $^{29}$Si NMR spectroscopy.

The alkenyl and alkoxy functional siloxane can contain 2 or more, 3 or more, 4 or more, 5 or more even 6 or more, while at the same time generally contains 10 or fewer, 8 or fewer, 6 or fewer and even 4 or fewer alkoxy functional groups on average per molecule. Desirably, determine the average number of alkoxysilyl groups from the materials used to make a composition of the present invention. If the materials used to make the composition are unknown, determine average number of alkoxysilyl groups per molecule by NMR spectroscopy and infrared spectroscopy. The alkoxy functional group is attached to a silicon atom of a siloxane unit so as to form an alkoxysilyl group. Desirably, the alkoxy functional groups are terminal functional groups. The alkoxy functional groups are desirably selected from $C_1$-$C_8$ saturated alkoxy (methoxy, ethoxy, propoxy, butoxy, pentoxy, hexoxy, heptoxy and octoxy) groups. Particularly desirable are methoxy groups.

Desirably, the alkenyl and alkoxy functional polysiloxane is a linear polysiloxane comprising, or even consisting of M-type and D-type siloxane units. The vinyl and alkoxy functional polysiloxane can comprise zero or more, one or more, even two or more of the sum of T-type and Q-type siloxane units on average per molecule; however, desirably the vinyl and alkoxy functional polysiloxane comprise two or fewer, preferably one or fewer of the sum of T-type and Q-type siloxane units on average per molecule. Whether linear or resinous, the alkenyl and alkoxy functional groups are desirably terminal functional groups of the polymer.

The remaining groups attached to the silicon atoms of the alkenyl and alkoxy functional siloxane other than the alkenyl groups and alkoxy groups can all be methyl, or can be a combination of methyl and non-methyl groups, or can be entirely non-methyl groups. Preferably, all of the groups attached to the silicon atoms other than alkenyl groups and alkoxy groups are independently in each occurrence selected from a group consisting of methyl and phenyl, and more preferably are all methyl.

Examples of suitable alkenyl and alkoxy functional polysiloxanes include those having the following structure:

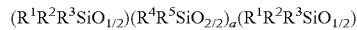

Where $R^1$, $R^2$, $R^3$, $R^4$ and $R^5$ are independently in each occurrence selected from a group consisting of alkoxy, alkenyl, alkyl and aryl groups provided that at least one is an alkenyl group and at least one other is an alkoxy group and subscript a is the average number of D-type units in the molecule and is a value of 10 or more, 20 or more, 40 or more 60 or more, 80 or more, 100 or more, 120 or more, 140 or more, 160 or more, 180 or more, 200 or more, 220 or more, 240 or more, 260 or more, 270 or more, 280 or more 290 or more and even 300 or more while at the same time is typically 1000 or less, 900 or less, 800 or less, 700 or less, 600 or less, 500 or less, 400 or less, 300 or less, 290 or less, or even 280 or less. Desirably, $R^1$ is an alkenyl group, preferably methoxy and $R^2$ and $R^3$ are alkoxy groups such as methoxy, $R^4$ and $R^5$ are each independently selected from a group consisting of methyl and phenyl and b is desirably 200 or more, 250 or more, 270 or more and at the same time is desirably 300 or less, 290 or less and even 280 or less.

One particularly desirable alkenyl and alkoxy functional polysiloxane has the following average structure:

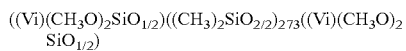

where "Vi" refers to a vinyl group (—CH=CH$_2$).

The alkenyl and alkoxy functional polysiloxane typically is present in the composition at a concentration of 10 weight-percent (wt %) or more, 20 wt % or more, 30 wt % or more, 40 wt % or more, 50 wt % or more, 60 wt % or more, 70 wt % or more, or even 80 wt % or more while at the same time is typically present at a concentration of 80 wt % or less, 70 wt % or less, 60 wt % or less, even 50 wt % or less relative to composition weight. Determine the wt % of this component in the composition preferably from the formula used to make the composition.

Mercapto-Functional Polysiloxane

The composition of the present invention further comprises a mercapto-functional polysiloxane, desirably different from the alkenyl and alkoxy functional polysiloxane, that comprises at least one mercapto-functional group. Mercapto-functional groups are thiol groups (—SH). The mercapto-functional group can be attached directly to a silicon atom of a siloxane unit or be attached to a carbon atom of a substituted alkyl group attached to a silicon atom of a siloxane group. For example, the mercapto functional group can be a thiol-substituted alkyl having from one to 10 carbon atoms. Examples of suitable thiol-substituted alkyl groups that can serve as mercapto functional groups include any one or combination of more than one group selected from a group consisting of methylthiol (—CH$_2$SH), ethylthiol (—CH$_2$CH$_2$SH), propylthiol (—CH$_2$CH$_2$CH$_2$SH), and butylthiol (—CH$_2$CH$_2$CH$_2$CH$_2$SH).

The mercapto-functional polysiloxane can comprise 2 or more, 3 or more 4 or more, even 5 or more mercapto functionalities and at the same time typically comprises 20 or fewer, 15 or fewer, 10 or fewer, 8 or fewer, 6 or fewer, or even 5 or fewer mercapto functionalities on average per molecule. Determine the average number of mercapto groups per molecule of the mercapto-functional polysiloxane preferably from knowledge of the structure of the mercapto-functional polysiloxane used to prepare the composition. If it is unknown what materials are used to make the composition, determine the average number of mercapto groups per molecule of mercapto-functional polysiloxane using nuclear magnetic resonance (NMR) spectroscopy and elemental analysis.

Desirably, the mercapto-functional polysiloxane comprises, preferably consists of M-type and D-type siloxane units. For instance, the mercapto-functional polysiloxane can have the following general structure:

$(R^6R^7R^8SiO_{1/2})_b(R^9R^{10}SiO_{2/2})_c(R^{11}SiO_{3/2})_d(SiO_{4/2})_e$

Where $R^6$, $R^7$, $R^8$, $R^9$, $R^{10}$, and $R^{11}$ are each independently in each occurrence selected from a group consisting of hydrogen, thiol, alkyl groups, aryl groups, substituted alkyl groups including alkyl thiol, and substituted aryl groups provided that at enough of $R^6$-$R^{11}$ are selected from thiol or thiol substituted alkyl in each molecule to provide the requisite average number of mercapto-functional groups; and subscript b is the average number of M-type siloxane units in the molecule, subscript c is the average number of D-type siloxane units in the molecule, subscript d is the average number of T-type siloxane units in the molecule and subscript e is the average number of Q-type siloxane units in the molecule; and where subscript b can be any number greater than zero, preferably one or more, more preferably 2 or more and can be 3 or more, 4 or more, even 5 or more while at the same time is generally 8 or less, 6 or less, 4 or less, 3 or less or even 2 or less; subscript c can be any number greater than zero and in preferably 10 or more, 20 or more, 30 or more 40 or more even 50 or more while at the same time is generally 100 or less, 80 or less, 60 or less even 50 or less; subscript d can be zero or more, one or more, 2 or more even 3 or more while at the same time is generally 6 or less, 5 or less, 3 or less, 2 or less even one or less; and subscript be can be zero or more, one or more, 2 or more even 3 or more while at the same time is generally 6 or less, 5 or less, 3 or less, 2 or less even one or less. Desirably, the sum of subscripts d and e is 3 or less, 2 or less even 1 or less or even zero.

Desirably, the mercapto-functional group is bound to a D-type siloxane unit of the mercapto-functional polysiloxane, preferably all of the mercapto-functional groups are bound to D-type siloxane units of the mercapto-functional polysiloxane. The mercapto-functional polysiloxane can be a mercapto-functional polydimethylpolysiloxane with the mercapto groups bound to D-type siloxane units. For example, mercapto-functional polysiloxane can be a polydimethylsiloxane having pendant mercaptopropyl groups bound to one or more than one D-type siloxane unit. One desirable mercapto-functional polysiloxane has the following average formula:

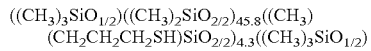

$((CH_3)_3SiO_{1/2})((CH_3)_2SiO_{2/2})_{45.8}((CH_3)(CH_2CH_2CH_2SH)SiO_{2/2})_{4.3}((CH_3)_3SiO_{1/2})$

The mercapto-functional polysiloxane is typically present in the composition at a concentration of 5 wt % or more, 6 wt % or more 7 wt % or more, 8 wt % or more, 9 wt % or more, 10 wt % or more, 12 wt % or more, 13 wt % or more, 14 wt % or more, 16 wt % or more, 18 wt % or more, 20 wt % or more, 25 wt % or more, 30 wt % or more, 35 wt % or more and even 40 wt % or more while at the same time is typically present at a concentration of 45 wt % or less, 40 wt % or less, 35 wt % or less, 30 wt % or less, 25 wt % or less, 20 wt % or less, 19 wt % or less, 18 wt % or less, 17 wt % or less, 16 wt % or less, 15 wt % or less, 10 wt % or less, or even 8 wt % or less based on composition weight. Determine the wt % of this component in the composition preferably from the formula used to make the composition.

Crosslinker

The composition of the present invention further comprises a silane crosslinker with at least two alkoxy groups per molecule. The silane crosslinker can be a polysilane (that is, comprise multiple silane units such as a disilane, trisilane, or tetrasilane) or the silane crosslinker can be monosilane. The silane comprise at least to alkoxy group and can comprise three or more and even four alkoxy groups on average per molecule. The alkoxy groups are desirably independently in each occurrence selected from $C_1$-$C_8$ alkoxy groups such as methoxy, ethoxy, propoxy, butoxy and pentoxy.

Examples of suitable silane crosslinkers include dimethyldimethoxysilane, methyltrimethoxy silane, dimethyldiethoxysilane, hexamethoxy disilylhexane and isobutyltrimethoxysilane, phenyltrimethoxysilane and any combination of two or more thereof.

Typically, the silane crosslinker is present in the composition at a concentration of 0.5 wt % or more, 1 wt % or more, 2 wt % or more, 3 wt % or more, 4 wt % or more, 5 wt % or more, 6 wt % or more, 7 wt % or more 8 wt % or more, 9 wt % or more, even 10 wt % or more while at the same time typically contains 8 wt % or less, 7 wt % or less, 6 wt % or less, 5 wt % or less, 4 wt % or less, 3 wt % or less, 2 wt % or less of the alkoxy silane compound based on composition weight. Determine the wt % of this component in the composition preferably from the formula used to make the composition.

Photoinitiator

The composition of the present intention further comprises a photoinitiator. Desirably, the photoinitiator is one or a combination of more than one compound selected from phosphine oxide photoinitiators and alpha-hydroxyketone photoinitiators. Examples of suitable phosphine oxide photoinitiators include 2,4,6-trimethylbenzoyldiphenyl phosphine oxide; bis(2,4,6-trimethylbenzoyl)-phenyl phosphine oxide; and ethyl(2,4,6,-trimethylbenzoyl) phenylphosphinate. Examples of suitable alpha-hydroxyketone photoinitiators include 2,2-dimethyoxy-1,2-diphenylethane-1-one; 1-hydroxy-cyclohexyl-phenyl-ketone; 2-hysroxy-2-methyl-1-phenyl-propan-1-one; and 1-[4-2(hydroxyethoxy)-phenyl]-2-hydroxy-2-hydroxy-2-methyl-1-propan-1-one.

Typically, the concentration of photoinitiator in the composition is 0.1 wt % or more, preferably 0.5 wt % or more, 1.0 wt % or more, 1.5 wt % or more, 2.0 wt % or more, 2.5 wt % or more, 3.0 and at the same time is desirably 5.0 wt % or less, preferably 4.0 or less, 3.0 or less, or 2.0 or less based on composition weight. Determine the wt % of this component in the composition preferably from the formula used to make the composition.

Moisture Cure Catalyst

The composition of the present invention further comprises a combination of zirconium tetraalkoxylate and alkylacetoacetate. Use of this combination of compounds at a particular mole ratio as the moisture cure catalyst surprisingly results in the shelf stability of the composition. The composition comprises a molar ratio of zirconium tetraalkoxylate to alkylacetoacetate that is 1:1 or more preferably 1:1.1 or more while at the same time is 1:4 or less, preferably 1:3 or less, more preferably 1:2 or less; yet more preferably 1:1.5 or less, 1:1.4 or less, and even 1:1.3 or less. Notably, a molar ratio of x:z is considered "more" than a molar ratio of x:y if z is a higher number than y. Surprisingly, when the molar ratio is in these ranges the composition achieves greater shelf stability than when the molar ratio is outside of these ranges.

The zirconium tetraalkoxylate has four alkoxylate groups complexed with a zirconium ion. The alkoxylate groups can be the same or different on the zirconium tetraalkoxylate. Suitable alkoxylates include any $C_1$ to $C_{10}$ alkoxylate. Particularly desirably alkoxylates include any one or any combination of more than one selected from methoxy, ethoxy, n-propoxy, iso-propoxy, n-butoxy, iso-butoxy, tert-butoxy, n-pentoxy, and iso-pentoxy. The zirconium tetraalkoxylate can be any one or any combination of more than one selected from a group consisting of zirconium tetra(n-butoxide) [aka, "zirconium (IV) n-butoxide" and zirconium tetra(n-butanolate)"], zirconium tetra(t-butoxide) (aka, "zirconium (IV) t-butoxide" and zirconium tetra(t-butanolate)"], zirconium tetra(iso-propoxide) [aka, "zirconium (IV) isopropoxide" and "zirconium tetra(iso-propanolate)"], zirconium tetra(n-propoxide) [aka "zirconium (IV) n-propoxide" and "zirconium tetra(n-propanolate)"], zirconium tetra(ethoxide) [aka "zirconium (IV) ethoxide"], and zirconium tetra(methoxide) [aka, zirconium (IV) methoxide"].

The alkylacetoacetate generally has the following structure: $(CX_3)COCH_2COOR$ where X is independently in each occurrence selected from a group consisting of hydrogen (H) and halogens (preferably fluorine (F)) and R is preferably a $C_1$ to $C_6$ alkyl or $C_1$ to $C_6$ substituted alkyl. Desirably, R is selected from $C_1$ to $C_6$ alkyl groups include those selected from a group consisting of methyl, ethyl, n-propyl, iso-propyl, n-butyl, iso-butyl, tert-butyl, n-pentyl, iso-pentyl, n-hexyl, and iso-hexyl groups. Desirably, the alkylacetoacetate has the following structure: $(CH_3)COCH_2COOR$ where R is as defined above. The alkylacetoacetate can have a halogen for any one or all of the X units. For instance, the alkylacetoacetate can be an alkyltrifluoroacetoacetate having the following structure: $(CF_3)COCH_2COOR$ where R is as defined above.

Desirable moisture cure catalyst combinations include a combination of zirconium tetralkoxylate and alkylacetoacetate. Particularly desirably moisture cure catalyst combinations include zirconium tetra(n-butoxide) and/or zirconium tetra(n-propoxide) in combination with methyl acetoacetate.

Typically, the concentration of moisture cure catalyst is 0.1 wt % or more, 0.5 wt % or more, one wt % or more, 2 wt % or more, 3 wt % or more and even 4 wt % or more while at the same time is generally 3 wt % or less, 2 wt % or less or even 1 wt % or less relative to composition weight. Determine the wt % of this component in the composition preferably from the formula used to make the composition.

Optional Additives

The composition of the present invention can further comprise or be free of any one or any combination of optional additives selected from a group consisting of reinforcing filler, photopolymerization inhibitor, pigment, antioxidant, ultraviolet light absorbers, plasticizer, adhesion promoters, fillers, photosensitizer, and surfactants. Reinforcing fillers include fumed silica powder, precipitated silica powder, fused silica powder, baked silica powder, fumed titanium oxide powder, glass fiber and hydrophobized powders obtained by surface treating any of these powders with organosilane, silazane, and/or siloxane oligomer. Typically reinforcing fillers have an average particle size in a range of 0.01 to 1,000 micrometers as determined by laser diffraction. Photopolymerization inhibitors include hydroquinone, t-butylhydroquinone, p-methoxyphenol, nitrobenzene, BHT (2,6-di-teret-butyl-4-methylphenol), and aluminum N-nitrosophenylhydroxyl-amine.

Compositions of the present invention surprisingly demonstrate unexpectedly long shelf stability with respect to dual cure characteristics. Of most importance is shelf stability at 23° C. Shelf stability at 23° C. is characterized using an accelerated shelf stability test that requires heating a composition to 50° C. for two weeks prior to evaluating the dual cure character of the compositions at 23° C.

EXAMPLES

Table 1 presents the components for use in the following examples. Sample formulae are in Table 2. Values in Table 2 are weight-parts of the corresponding components. When a value is not present for a component the component was not included in the formulation.

Prepare samples according to the formulae in Table 2 by first mixing together Components A and B to form a Mixture 1. In a separate container mix together the silane crosslinker, photoinitiator and moisture cure catalyst to form a Mixture 2. If the moisture cure catalyst comprises multiple components then first those together to form a moisture cure catalyst blend prior to mixing with the silane crosslinker and photoinitiator. In a 1Q Ross mixer add Mixture 1 and mix under vacuum (at a pressure of approximately 21 kilopascals). Then add Mixture 2 while mixing. Upon complete mixing, draw the sample composition into a UV protected syringe while avoiding exposure of the sample mixture to ultraviolet light and moisture. Store the syringe without exposure to ultraviolet light until the sample mixture is use.

Evaluate the UV and the moisture cure capabilities of each sample both in a "fresh" state directly after being made and also in an "aged" state after being stored for 2 weeks at 50° C. in an oven. Evaluate each Sample "fresh" and "aged" in the UV Cure Test and Moisture Cure Test. Test results are in Table 2 with the Sample formulations.

UV Cure Test. Apply a formulation onto a glass plate to a form a film having a thickness of approximately 2-3 millimeters and expose to UV light of 395 or 405 nanometers wavelength with 500-10,000 milliJoules per square centimeters of energy. Determine if the sample cured by touching the surface. If the surface is wet there is no cure. If the sample is rigid, even if there is some tackiness, then there is cure. Characterize the samples as "not cured" if wet, "cured-tacky" if cured but tacky, and "cured-hard" if cured without being tacky.

Moisture Cure Test. Apply a 1-2 millimeter thick film onto a glass substrate at 23° C. (+/−1° C.) and 50% (+/−5%) relative humidity. Touch the surface of the sample gently every 5-10 minutes until the sample does not transfer to your finger or has remained uncured or tacky for several hours. If the surface remains wet such that material continues to transfer to your finger there is no cure. However, if the sample is rigid and no sample remains on your finger, even if there is some tackiness but sample does not transfer to your finger then there is cure. Characterize the samples as "not cured" if wet, "cured-tacky" if cured but tacky, and "cured-hard" if cured without being tacky.

Results

Sample 1 illustrates that diisopropoxytitanium bis(ethylacetoacetate) alone as the moisture cure catalyst facilitates dual cure for the "fresh" sample, but after aging the formulation no longer cures by UV light.

Samples 2-5 illustrate that numerous other moisture cure catalysts alone also fail to result in UV cured samples after aging.

Samples 6-13 illustrate that when the moisture cure catalyst is a combination of zirconium tetraalkoxylate and alkylacetoacetate at a mole ratio in a range of 1:1 to 1:4 the sample cures by both moisture and UV light when "fresh" and when "aged". Some of the samples cured only to a tacky state, but nonetheless demonstrated curing to some extent.

Samples 6, 7 and 13 illustrate that when the moisture cure catalyst is a combination of zirconium tetraalkoxylate and alkylacetoacetate at a mole ratio in a range of 1:1 to 1:1.3 the sample cures to a non-tacky state by both moisture and UV light when "fresh" and "aged".

TABLE 1

| Component | Description | Source |
|---|---|---|
| Comp A -- Alkenyl and Alkoxy Functional Polysiloxane | Vinylmethoxy end-capped polydimethylsiloxane having the following average structure: $M^{Vi(MeO)2}DM^{vi(MeO)2}$ where: "MeO" is methoxy "Vi" is a vinyl group. | Reaction product of hydroxyl terminated polydimethylsiloxane having an average of 273 D units and vinyl trimethoxysilane. |
| Comp B -- Mercapto-Functional Polysiloxane | Mercapto-functional polydimethylsiloxane having the following average structure: $MD_{45.8}D^{PrSH}{}_{4.3}M$ Where: "PrSH" is $-CH_2CH_2CH_2SH$ | Commercially available from Gelest under the name SMS992. |
| Comp C -- silane crosslinker | Methyltrimethoxy silane | Available from SigmaAldrich |
| Comp D -- Photoinitiator | Diphenyl(2,4,6-trimethylbenzoyl) phosphine oxide | Available from SigmaAldrich |
| Moisture Cure Catalysts and Catalyst Components | | |
| MCC1 | Diisopropoxytitanium Bis(ethylacetoacetate) | Available from SigmaAldrich |
| MCC2 | Stannous octoate | Available from SigmaAldrich |
| MCC3 | Dimethyltin dineodecanoate | Available from Gelest, Inc. |
| MCC4 | Bismuth neodecanoate | Available from SigmaAldrich |
| MCC5 | Zirconium (IV) n-butoxide | Available form Dorf-Ketal as an 87% active solution in n-butanol under the name TYZOR™ NBZ |
| MCC6 | Zirconium (IV) n-propoxide | Available form Dorf-Ketal as 74% active solution in n-propanol under the name TYZOR™ NPZ |
| MCC7 | Methyl acetoacetate | Available from Eastman |
| MCC8 | Ethyl acetoacetate | Available form Eastman |

$M^{Vi(MeO)2}DM^{vi(MeO)2} = ((Vi)(MeO)_2SiO_{1/2})((Me)_2SiO_{2/2})_{273}((Vi)(MeO)_2SiO_{1/2})$ $MD_{45.8}D^{PrSH}{}_{4.3}M = ((Me)_3SO_{1/2})((Me)_2SO_{2/2})_{45.8}((Me)(PrSH)SiO_{2/2})_{4.3}((Me)_3SO_{1/2})$

TABLE 2

| Component | 1 | 2 | 3 | 4 | 5 | 6 | 7 | 8 | 9 | 10 | 11 | 12 | 13 |
|---|---|---|---|---|---|---|---|---|---|---|---|---|---|
| Comp (A) | 100 | 100 | 100 | 100 | 100 | 100 | 100 | 100 | 100 | 100 | 100 | 100 | 100 |
| Comp (B) | 9.20 | 9.40 | 9.40 | 9.10 | 9.20 | 9.40 | 9.40 | 9.40 | 9.40 | 9.40 | 9.40 | 9.40 | 9.40 |
| Comp (C) | 3.50 | 3.50 | 3.50 | 3.50 | 3.50 | 3.50 | 3.50 | 3.50 | 3.50 | 3.50 | 3.50 | 3.50 | 5.00 |
| Comp (D) | 0.58 | 0.58 | 0.58 | 0.58 | 0.58 | 0.58 | 0.58 | 0.58 | 0.58 | 0.58 | 0.58 | 0.58 | 0.58 |
| MCC1 | 1.10 | | | | | | | | | | | | |
| MCC2 | | 0.20 | | | | | | | | | | | |
| MCC3 | | | 2.30 | | | | | | | | | | |
| MCC4 | | | | 3.50 | | | | | | | | | |
| MCC5 | | | | | 3.50 | | | | | | | | |
| MCC5/MCC7 (1:1.1)* | | | | | | 3.50 | | | | | | | |
| MCC5/MCC7 (1:1.3)* | | | | | | | 3.50 | | | | | | 3.50 |
| MCC5/MCC7 (1:1.5)* | | | | | | | | 3.50 | | | | | |
| MCC5/MCC7 (1:2)* | | | | | | | | | 3.50 | | | | |
| MCC6/MCC7 (1:2)* | | | | | | | | | | 3.50 | | | |
| MCC5/MCC8 (1:2)* | | | | | | | | | | | 3.50 | | |
| MCC5/MCC7 | | | | | | | | | | | | 3.50 | |

TABLE 2-continued

| Component | Sample | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| (1:4)* | | | | | | | | | | | | | |
| UV Cure Test (NC = Not Cured; $C_T$ = Cured-Tacky; $C_H$ = Cured-Hard) | | | | | | | | | | | | | |
| Fresh | $C_H$ | $C_H$ | $C_T$ | NC | $C_H$ | $C_H$ | $C_H$ | $C_H$ | $C_H$ | $C_H$ | $C_H$ | $C_H$ | $C_H$ |
| Aged | NC | $C_T$ | $C_T$ | NC | NC | $C_H$ | $C_H$ | $C_H$ | $C_T$ | $C_T$ | $C_T$ | $C_T$ | $C_H$ |
| Moisture Cure Test (NC = Not Cured; $C_T$ = Cured-Tacky; $C_H$ = Cured-Hard) | | | | | | | | | | | | | |
| Fresh | $C_H$ | NC | NC | NC | $C_T$ | $C_H$ | $C_H$ | $C_H$ | $C_T$ | $C_T$ | $C_T$ | $C_T$ | $C_H$ |
| Aged | $C_T$ | NC | NC | NC | $C_T$ | $C_H$ | $C_H$ | $C_T$ | $C_T$ | $C_T$ | $C_T$ | $C_T$ | $C_H$ |

*These catalysts are blends of two MCC components and the ratio is the mole ratio of the two components.

What is claimed is:

1. A composition comprising the following components: (a) a polysiloxane having at least one alkenyl functional group and at least one alkoxy functional group; (b) a mercapto-functional polysiloxane with at least one mercapto functionality; (c) a silane crosslinker with at least two alkoxy groups per molecule; (d) a photoinitiator; (e) a combination of zirconium tetraalkoxylate and alkylacetoacetate at a mole ratio in a range of 1:1 to 1:4.

2. The composition of claim 1, wherein the zirconium tetraalkoxylate is selected from a group consisting of zirconium tetra(n-butanolate), zirconium tetra(t-butanolate), and zirconium tetra(n-propanolate).

3. The composition of claim 1, wherein the alkyl acetoacetate is any one or any combination of more than one component selected from a group consisting of methyl acetoacetate, ethyl acetoacetate and ethyltrifluoroacetoacetate.

4. The composition of claim 1, wherein the combination of zirconium tetraalkoxylate and alkylacetoacetate is present at a mole ratio in a range of 1:1.1 to 1:1.5.

5. The composition of claim 1, wherein component (a) is a polysiloxane having at least one alkenyl functional group and at least two alkoxy functional groups.

6. The composition of claim 1, wherein component (b) is a polydimethylsiloxane having pendant mercaptopropyl groups.

7. The composition of claim 1, wherein component (c) is one or any combination or more than one component selected from a group consisting of dimethyldimethoxysilane, dimethyldiethoxysilane, methyltrimethoxysilane, hexamethoxydisilyhexane, phenyltrimethoxysilane and isobutyltrimethoxysilane.

8. The composition of claim 1, wherein component (d) comprises a phosphine oxide photoinitiator and/or an alpha-hydroxyketone photoinitiator.

9. The composition of claim 1, wherein the composition is free of tin catalysts and bismuth catalysts.

10. The composition of claim 1, wherein the concentration of the combination of zirconium tetraalkoxylate and alkylacetoacetate is present at a concentration in a range of one to five weight-parts relative to 100 weight-parts of the polysiloxane of component (a).

* * * * *